(12) United States Patent
Barreiros Formoso

(10) Patent No.: US 9,988,128 B2
(45) Date of Patent: Jun. 5, 2018

(54) SYSTEM FOR TRANSPORTING AND INSTALLING WIND TURBINES ON THE SEAFLOOR

(71) Applicant: Ocean Shift, S.L., Santiago de Compostela (La Coruna) (ES)

(72) Inventor: Juan Fernando Barreiros Formoso, Santiago de Compostela (La Coruna) (ES)

(73) Assignee: OCEAN SHIFT, S.L., Santiago de Compostela (La Coruna) (ES)

( * ) Notice: Subject to any disclaimer, the term of this patent is extended or adjusted under 35 U.S.C. 154(b) by 0 days. days.

(21) Appl. No.: 15/440,086

(22) Filed: Feb. 23, 2017

(65) Prior Publication Data
US 2017/0283013 A1  Oct. 5, 2017

(51) Int. Cl.
*B63B 35/44* (2006.01)
*F03D 13/40* (2016.01)
*F03D 13/10* (2016.01)
*B63B 21/50* (2006.01)
*B63B 21/26* (2006.01)

(52) U.S. Cl.
CPC .............. *B63B 35/44* (2013.01); *B63B 21/26* (2013.01); *B63B 21/50* (2013.01); *F03D 13/10* (2016.05); *F03D 13/40* (2016.05); *B63B 2035/446* (2013.01); *F05B 2230/6102* (2013.01)

(58) Field of Classification Search
CPC .............. B63B 35/44; B63B 2035/446; B63B 2035/4433
USPC ........................................ 405/203, 204, 209
See application file for complete search history.

(56) References Cited

U.S. PATENT DOCUMENTS 8,701,579 B2 * 4/2014 Roodenburg ......... B63B 35/003
114/61.1
2011/0058925 A1 * 3/2011 Springett ................ B63B 27/16
414/785

* cited by examiner

*Primary Examiner* — Sean D Andrish
(74) *Attorney, Agent, or Firm* — Lucas & Mercanti, LLP

(57) ABSTRACT

System for transporting and installing wind turbines on the seafloor, made up of a structure that has adjustable flotation capacity and is made up of two floating hulls and a series of columns onto which they are mounted with the capacity to move over the same, an upper peripheral frame and a lower peripheral frame, on which means are mounted for fastening and manipulating the wind turbines and piles and ferrules for anchoring said wind turbines to the seafloor.

4 Claims, 7 Drawing Sheets

SYSTEM FOR TRANSPORTING AND INSTALLING WIND TURBINES ON THE SEAFLOOR

CROSS REFERENCE TO RELATED APPLICATION

This application claims priority of Spanish Patent Application No. P201630385 filed on Mar. 31, 2016, which is incorporated herein by reference.

FIELD OF THE INVENTION

The present invention relates to a system for transporting and installing wind turbines on the seafloor, made such that it also serves as a means of transportation for wind turbines and the components necessary for the assembly thereof, from the point of embarkation of the wind turbines to the point of assembly of the same, off the coast.

BACKGROUND OF THE INVENTION

For the assembly of offshore wind turbines two systems are generally used: mounting on platforms and mounting on the seafloor.
The second system is traditionally done by constructing the wind turbines on land and subsequently transporting them to the site where they are to be installed. This system is done by traditional maritime means of transport, which means that the assembly stage is slow and costly.

DESCRIPTION OF THE INVENTION

The aim of the present invention is a system for mounting wind turbines on the seafloor, which allows the necessary mounting options to be done in faster, simpler and safer ways, leading to a considerable reduction in the cost of the mounting.

Another aim of the present invention is to provide a system that also allows for the transportation of wind turbines and elements necessary for the mounting thereof on the seafloor, from the point of embarkation of the wind turbines to the point of the assembly of the same.

In accordance with the invention, the system is made up of a supporting structure that has adjustable floating capacity and is able to transport a series of wind turbines, as well as anchoring piles and coupling ferrules, which will serve as a means for anchoring the wind turbines to the seafloor.

The supporting structure is made up of two lower parallel floating hulls, to which anchored in a vertical position are vertical columns distributed in two parallel rows, in which the columns are preferably placed in coinciding positions on both hulls.

The vertical columns will preferably be made up of a tubular structure with floating capacity, and both said columns and the floating hulls will have floodable chambers in order to adjust the floating capacity thereof.

Mounted on the vertical columns is an upper peripheral frame and a lower peripheral frame, located at different heights and with the capacity to move over the length of said columns. The sliding of the frames can be done through mechanical means, hydraulic means, etc.

Each frame may be made up of longitudinal and transverse beams that run between rings which clasp the columns, with the capacity to slide the length of the same.

The supporting structure also supports an upper inner rail which is suspended from the upper frame and traces a path which runs within the contour limited by the two rows of vertical columns close to the same. This path may be a U-shaped contour, the lateral parts of which are perpendicular to the vertical columns, each extension running close to one of the rows of columns, with the central part between said rows perpendicular to the same.

Mounted on the upper inner rail is at least one, and preferably two, conveyor carriages, capable of sliding the length of said carriage. Fastening means for the anchoring piles and coupling ferrules are arranged in a vertical position below the upper inner carriage.

Installed in the supporting structure are means for manipulating and mounting the wind turbines. These means may consist of large-tonnage main upper and lower cranes installed on carriages that run on the outside of the row of columns, close to the same, suspended, respectively, from the upper peripheral frame and from the lower peripheral frame. The system also has physical contact measuring means for the mounting of the wind turbines, means which are located on the outside of the row of columns and are capable of sliding the length of the lower outer rail. These measuring means may be made up of a telescopic arm ending at an end gripper that makes physical contact with a previously installed coupling ferrule in order to adjust its positioning.

Large-tonnage cranes serve for mounting the wind turbines on the system of the invention at the point of embarkation, as well as for fastening the wind turbines to said system during transportation and for the installation thereof at the point of assembly. The aforementioned position measuring means also intervene in the latter operation.

BRIEF DESCRIPTION OF THE DRAWINGS

A non-limiting exemplary embodiment is shown in the accompanying drawings, where.

DETAILED DESCRIPTION OF AN EMBODIMENT

Figure 1:
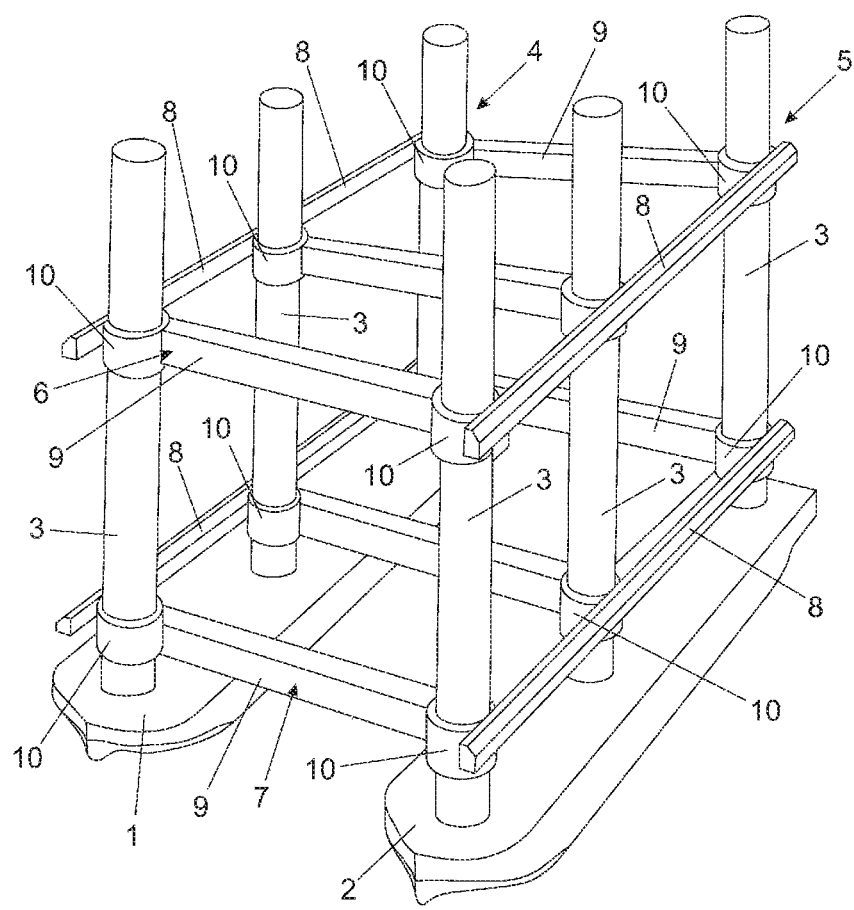
FIG. 1 is a schematic perspective of a system constituted in accordance with the invention.
Figure 2:
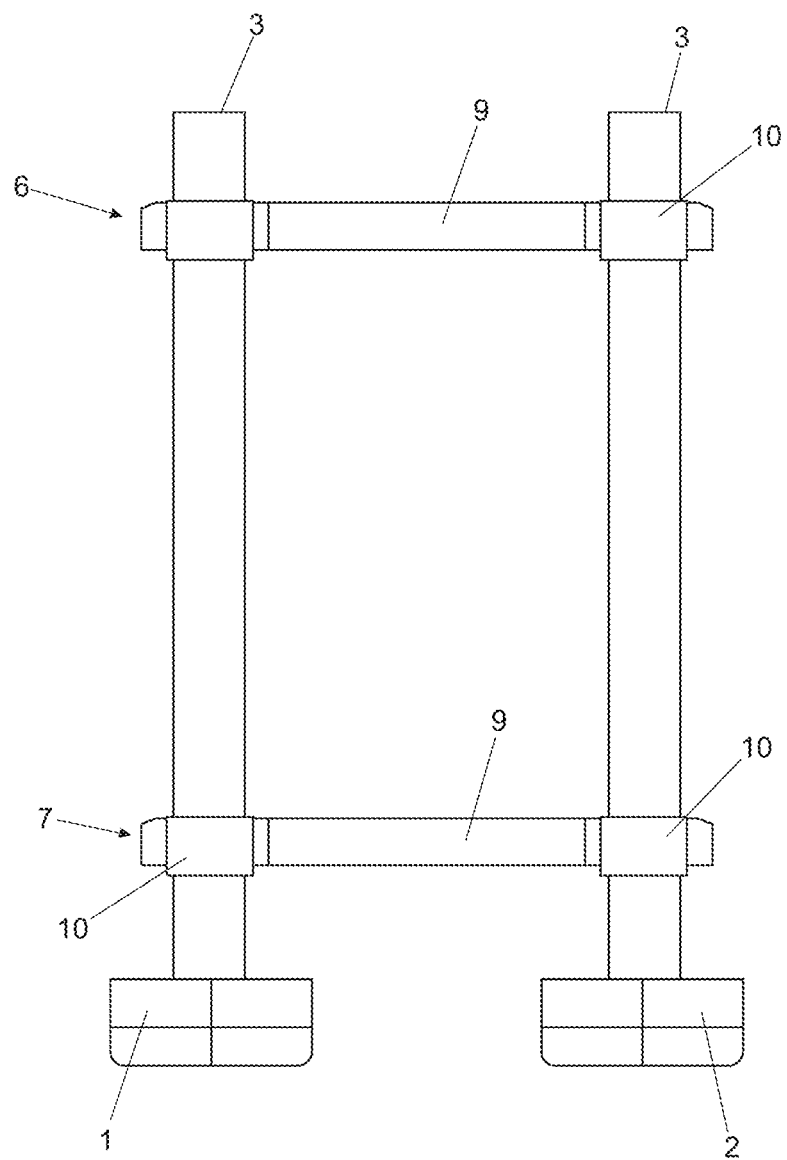
FIGS. 2 and 3 show a front and side elevation view, respectively, of the same system.
Figure 3:
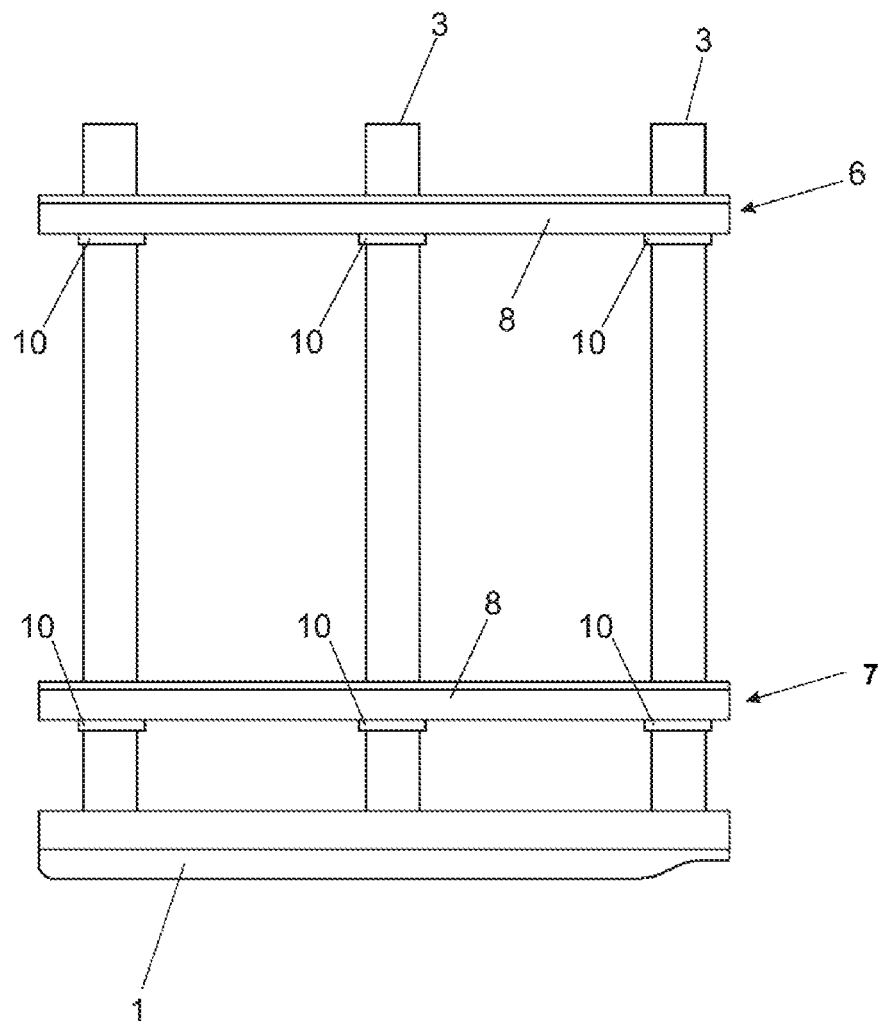

FIGS. 1 to 3 show a system for transporting and installing wind turbines on the seafloor which is made up of a supporting structure made up of two lower parallel floating hulls (1-2) and by a series of vertical columns (3) that are anchored at the lower end thereof to the floating hulls, preferably at coinciding positions, made up of two parallel rows (4 and 5).

The floating hulls (1 and 2) will have floodable chambers in order to adjust their floating capacity.

The columns (3) will preferably be made of a tubular structure, forming watertight chambers that can be floodable to provide adjustable floating capacity.

Mounted on the columns (3) is an upper peripheral frame (6) and a lower peripheral frame (7) located at different heights and with the capacity to move on said columns by means of systems of actuation that are mechanical, hydraulic, etc., in order to adjust the height thereof.

Each frame (6-7) is made up of longitudinal and transverse beams (8, 9, respectively) that run between rings (10) mounted on the columns (3), with the capacity to slide the length of the same.

Figure 4:
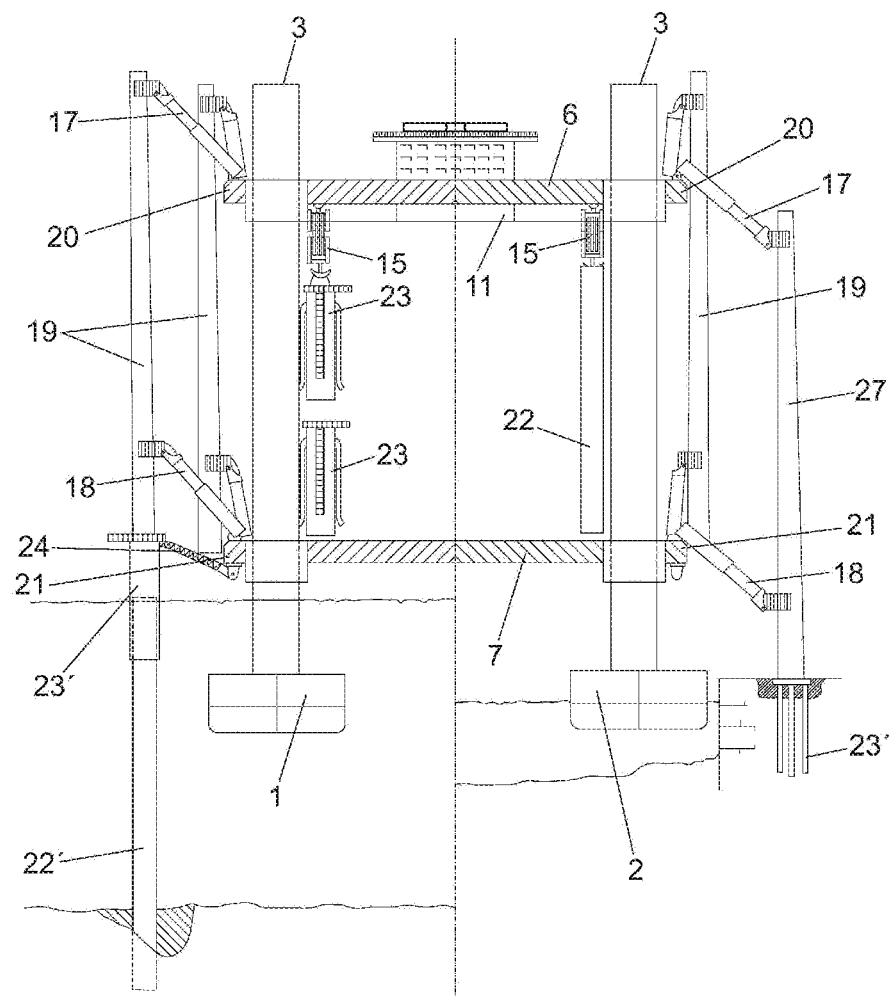
FIG. 4 shows a similar view to that of FIG. 2, including the fastening and transport means of the wind turbines.
Figure 5:
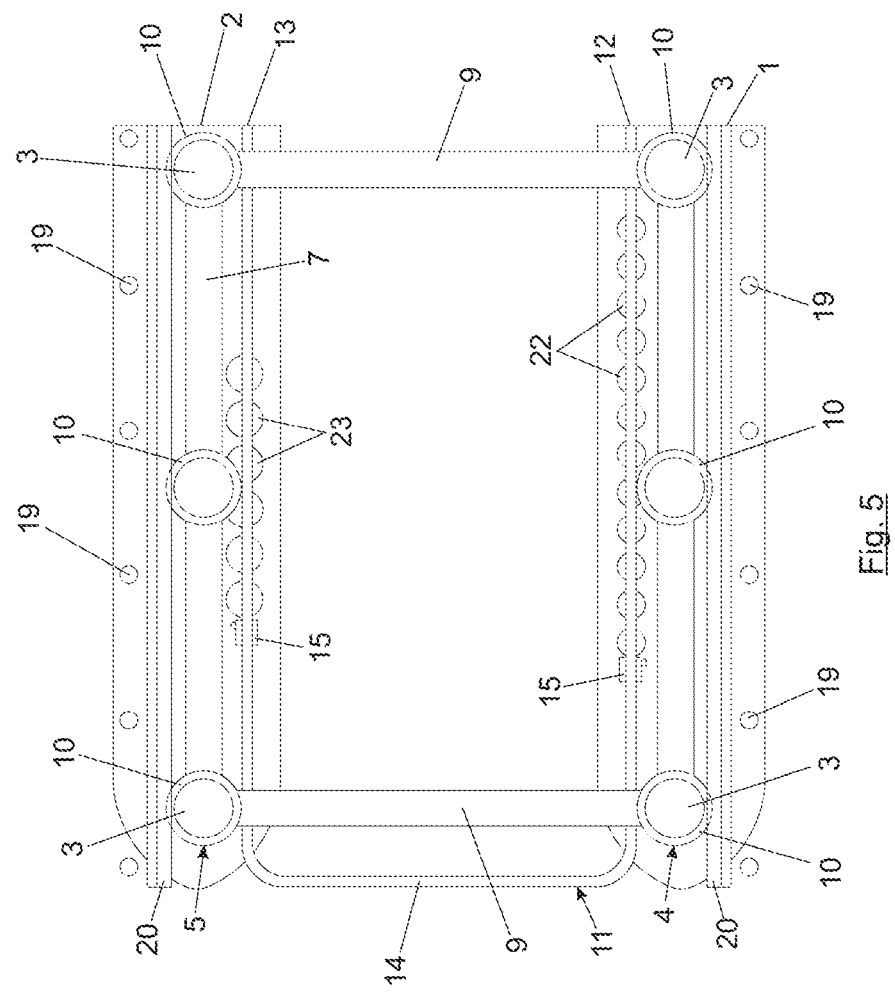
FIG. 5 shows a plan view of the system of the invention.

According to FIGS. 4 and 5, between the two rows (4 and 5) of columns (3) the supporting structure supports a first rail (11) that traces a U-shaped path, the lateral extensions (12 and 13) of which run in a perpendicular direction to that of the columns (3), each lateral extension (12 and 13) close to one of the rows (4 and 5) of the columns, while the central extension (14) runs in perpendicular direction to that of rows (4 and 5) of the columns.

Mounted on the rail (11) are conveyor carriages (15), capable of sliding the length of said carriage.

Figure 6:
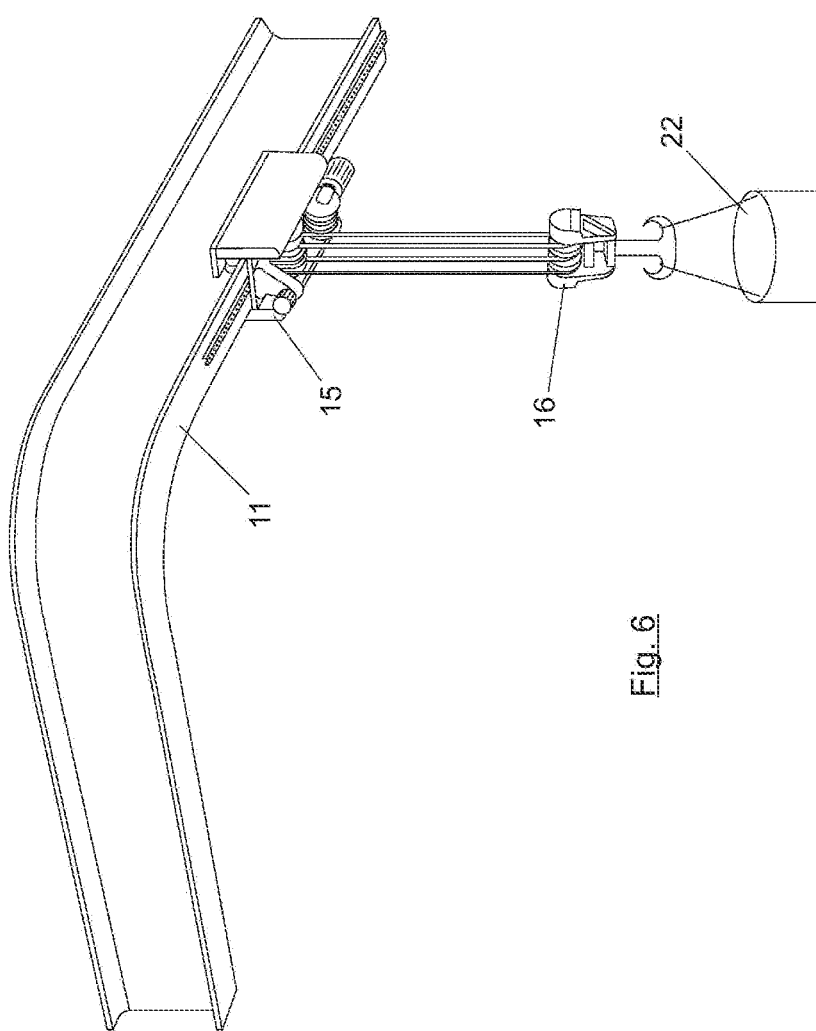
FIG. 6 is a detailed perspective view of the upper inner rail, carrier of the conveyor carriages.

FIG. 6 shows a section of the first rail (11) with a conveyor carriage (15), which is provided with suspension means (16) of a known constitution.

According to FIG. 4, the system is also provided with means for fastening and manipulating the wind turbines, located outside the limited contour by rows (4 and 5) of vertical columns (3) and made up of main upper cranes (17) and main lower cranes (18) distributed in two levels, which serve to load the wind turbines at the point of embarkation, to fasten the wind turbines (19) in a vertical position during the transportation thereof and to manipulate the wind turbines at the moment of their installation at the point of assembly.

The main upper and lower cranes (17 and 18, respectively) are mounted on upper rails (20) and lower rails (21) which run on the outside of the rows (4-5) of columns (3), close to the same, and are suspended, respectively, from the upper peripheral frame (6) and from the lower peripheral frame (7).

Arranged inside the contour delimited by the two rows (4 and 5) of columns (3) are fastening means in a vertical position consisting of anchoring piles (22) and coupling ferrules (23) for the generators, distributed on either side of the rows located below the first rail (11) and conveyor carriages (15).

Figure 7:
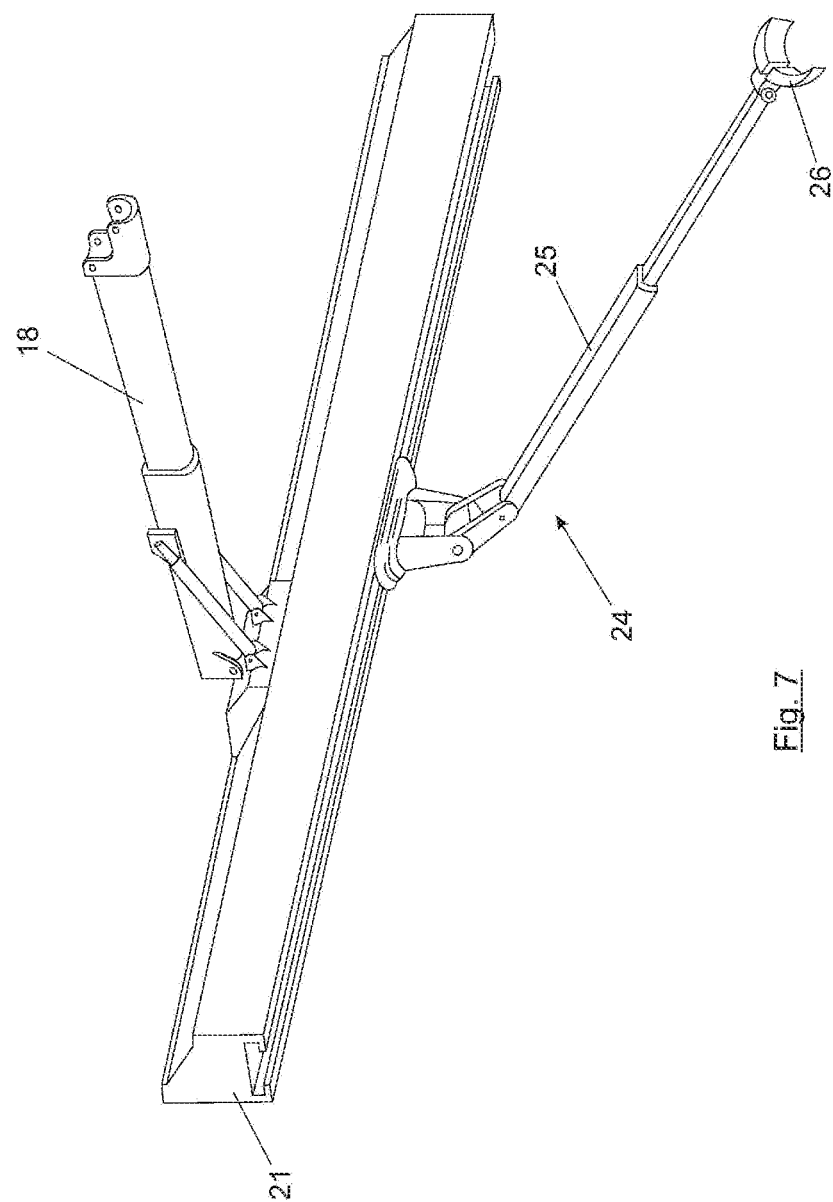
FIG. 7 is a detailed perspective view of the position gauge, for the mounting of the wind turbines.

Also mounted on the supporting structure, on the outside of each row (4 and 5) of columns (3) and on the second lower rail (21), FIG. 7, are means for measuring the position of the wind turbines consisting of an auxiliary crane (24) made up of a telescopic arm (25) which ends at an end gripper (26). This auxiliary crane has the capacity to move over the length of the second rail (21).

For the installation of the wind turbines, once the supporting structure is positioned in the desired location, by means of conveyor carriages (15), FIG. 6, a pile (22) is taken, it is transported to the installation point and it is driven into the seafloor until the pile reaches a different position (22"), FIG. 4. Following this step, by means of a conveyor carriage (15), one of the ferrules (23) is taken in the same way and coupled to the pile at the different position (22"), until the ferrules reach a different position (23"). Following this step, by means of the end gripper (26) of the auxiliary crane (24), FIG. 7, the ferrule at the different position (23") is adjusted and calibrated. Lastly, by means of the main upper and lower cranes (17 and 18, respectively), a wind turbine (19) is taken and transported to be placed on the previously adjusted ferrule at the different position (23") and inserted into the same until it is supported on the pile at the different position (22") in the final position (27).

This way, the wind turbines are mounted on the piles, coupled to the same by means of the corresponding ferrules.

The system of the invention is especially suited for the mounting of wind turbines at offshore location points, able to adapt to any size or power of the same, with the special particularity in that the mounting can be integral, meaning that when departing from the coast the wind turbine assembly is totally mounted with an equal number of piles and ferrules, mounted in a vertical position, and, as was previously described, it adapts to any type of foundation.

According to the depth of the seafloor on which the wind turbines will be installed, the height of the floating structure is adjusted by means of floodable chambers of the floating hulls (1 and 2) and of the columns (3).

During the mounting of the wind turbines, the height and separation of the upper and lower peripheral frames (6 and 7, respectively) is adjusted in accordance with the dimensions of the wind turbines.

The invention claimed is:

1. A system for transporting and installing wind turbines on the seafloor comprising:
a supporting structure which has adjustable floating capacity and is able to transport a series of wind turbines and anchoring piles and coupling ferrules for said wind turbines, the supporting structure comprising:
two lower and parallel floating hulls;
a series of vertical columns anchored at a lower end thereof to the floating hulls, distributed in two parallel rows;
an upper peripheral frame and a lower peripheral frame, mounted at different heights on the series of vertical columns from one side to an opposite side, capable of moving along a length of said series of vertical columns;
a first rail suspended from the upper peripheral frame and tracing a path that runs within a contour defined by the two rows of vertical columns holding at least one conveyor carriage capable of moving along the length of said rail;
means for fastening and manipulating the wind turbine comprising main upper cranes and main lower cranes mounted on second upper rails and lower rails which run outside of the rows of columns and are suspended from the upper peripheral frame and the lower peripheral frame, respectively; and
fastening means for the anchoring piles and coupling ferrules in a vertical position located within the two parallel rows and the series of vertical columns and below the first rail.

2. The system according to claim 1, wherein the first rail traces a U-shaped path, lateral extensions of the first rail run in a perpendicular direction to the series of vertical columns, each lateral extension close to one of the parallel rows of vertical columns, and a central extension of the first rail runs perpendicularly to said parallel rows of vertical columns.

3. The system according to claim 1, wherein the upper and lower peripheral frames comprise longitudinal and transverse beams which run between rings mounted on the vertical columns capable of sliding along the length of the vertical columns.

4. The system according to claim 1, wherein the supporting structure is also a carrier structure, outside the contour defined by the rows of vertical columns, with means for fixing the position of the wind turbines which are mounted and have the ability to move along the length of the second upper and lower rails and are made up of an auxiliary crane formed by a telescopic arm which ends at an end gripper.

* * * * *